(12) United States Patent
Heinla et al.

(10) Patent No.: US 9,130,894 B2
(45) Date of Patent: *Sep. 8, 2015

(54) DELIVERING MESSAGES IN A COMMUNICATION SYSTEM

(75) Inventors: Ahti Heinla, Tallinn (EE); Teet Kõnnussaar, Tallinn (EE); Indrek Mandre, Tallinn (EE); Lauri Tepandi, Tallinn (EE)

(73) Assignee: Skype, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,518

(22) Filed: Jul. 31, 2012

(65) Prior Publication Data

US 2012/0296976 A1 Nov. 22, 2012

Related U.S. Application Data

(63) Continuation of application No. 11/285,396, filed on Nov. 23, 2005, now Pat. No. 8,275,841.

(51) Int. Cl.
*G06F 15/16* (2006.01)
*H04L 12/58* (2006.01)

(52) U.S. Cl.
CPC ...................... *H04L 51/22* (2013.01)

(58) Field of Classification Search
CPC ........................................................ H04L 51/34
USPC ........................................................ 709/206
See application file for complete search history.

(56) References Cited

U.S. PATENT DOCUMENTS

| | | | |
|---|---|---|---|
| 6,134,582 A * | 10/2000 | Kennedy | 709/206 |
| 6,148,329 A | 11/2000 | Meyer | |
| 6,446,114 B1 * | 9/2002 | Bulfer et al. | 709/206 |
| 7,010,572 B1 * | 3/2006 | Benjamin et al. | 709/206 |
| 7,200,637 B2 | 4/2007 | Klos et al. | |
| 7,206,816 B2 * | 4/2007 | Gorty et al. | 709/206 |
| 7,373,424 B2 | 5/2008 | Surma et al. | |
| 8,275,841 B2 | 9/2012 | Heinla | |
| 2002/0026513 A1 * | 2/2002 | Hoglund et al. | 709/227 |

(Continued)

FOREIGN PATENT DOCUMENTS

| | | |
|---|---|---|
| AU | 2005338395 | 5/2007 |
| CN | 1645816 | 7/2005 |

(Continued)

OTHER PUBLICATIONS

Chapter 13: Distributed Databases, Modern Database Management 7th Edition, Jeffrey A. Hoffer, Mary B. Prescott, Fred R. McFadden © 2005 by Prentice Hall, wps.prenhall.com/wps/media/objects/1374/1407569/mdm7e_Ch13.ppt.*

(Continued)

*Primary Examiner* — Hamza Algibhah
(74) *Attorney, Agent, or Firm* — Sonia Cooper; Jim Ross; Micky Minhas

(57) ABSTRACT

Message delivery systems and methods for delivering messages to a computing system are described. The system uses a message ID structure and a message ID database to allow a user to check whether he or she is recipient of a new message without having to contact the message server that holds messages to be delivered. The resource load related to users checking for messages is therefore left to a separate computing system, allowing the message server to dedicate its resources to the receiving and delivering of messages.

20 Claims, 8 Drawing Sheets

(56) References Cited

U.S. PATENT DOCUMENTS

| | | | |
|---|---|---|---|
| 2002/0097850 A1* | 7/2002 | Schemers et al. | 379/90.01 |
| 2002/0188687 A1* | 12/2002 | Ballard | 709/206 |
| 2003/0023695 A1* | 1/2003 | Kobata et al. | 709/206 |
| 2003/0046533 A1* | 3/2003 | Olkin et al. | 713/152 |
| 2003/0172118 A1* | 9/2003 | Bilansky et al. | 709/206 |
| 2003/0229672 A1 | 12/2003 | Kohn | |
| 2004/0260701 A1 | 12/2004 | Lehikoinen et al. | |
| 2005/0004984 A1 | 1/2005 | Simpson | |
| 2005/0010644 A1* | 1/2005 | Brown et al. | 709/206 |
| 2005/0015506 A1 | 1/2005 | Padborg | |
| 2005/0021643 A1* | 1/2005 | Watanabe et al. | 709/206 |
| 2005/0021963 A1 | 1/2005 | Tomkow | |
| 2005/0038863 A1* | 2/2005 | Onyon et al. | 709/207 |
| 2005/0039048 A1* | 2/2005 | Tosey | 713/201 |
| 2005/0138196 A1* | 6/2005 | Pfeffer et al. | 709/231 |
| 2005/0164703 A1* | 7/2005 | Huynh | 455/432.3 |
| 2005/0171996 A1* | 8/2005 | Gorty et al. | 709/202 |
| 2005/0181768 A1* | 8/2005 | Roy | 455/413 |
| 2005/0210106 A1 | 9/2005 | Cunningham | |
| 2005/0223067 A1* | 10/2005 | Buchheit et al. | 709/206 |
| 2005/0262203 A1* | 11/2005 | Buchheit et al. | 709/206 |
| 2005/0289612 A1* | 12/2005 | Morton et al. | 725/76 |
| 2006/0059238 A1* | 3/2006 | Slater et al. | 709/206 |
| 2006/0075044 A1 | 4/2006 | Fox et al. | |
| 2006/0095528 A1 | 5/2006 | Skykes | |
| 2006/0101115 A1 | 5/2006 | Gleckman | |
| 2006/0112163 A1* | 5/2006 | Enatsu et al. | 709/203 |
| 2006/0149823 A1* | 7/2006 | Owen et al. | 709/206 |
| 2006/0248148 A1* | 11/2006 | Timmins et al. | 709/206 |
| 2007/0005702 A1* | 1/2007 | Tokuda et al. | 709/206 |
| 2007/0043817 A1 | 2/2007 | Oliver et al. | |
| 2007/0066284 A1* | 3/2007 | Gatzke et al. | 455/413 |
| 2007/0073815 A1* | 3/2007 | Kamat et al. | 709/206 |
| 2007/0078979 A1* | 4/2007 | Sisodia et al. | 709/225 |
| 2007/0133574 A1 | 6/2007 | Tejani et al. | |
| 2007/0143432 A1 | 6/2007 | Klos | |
| 2007/0232274 A1 | 10/2007 | Jung et al. | |
| 2007/0244974 A1 | 10/2007 | Chasin | |
| 2008/0016163 A1* | 1/2008 | Hyuong et al. | 709/206 |
| 2008/0046516 A1 | 2/2008 | Hyoung et al. | |
| 2008/0086532 A1 | 4/2008 | Cunningham | |
| 2008/0172473 A1 | 7/2008 | Davis et al. | |
| 2008/0183866 A1 | 7/2008 | Maeda et al. | |
| 2008/0244009 A1* | 10/2008 | Rand et al. | 709/206 |
| 2010/0011079 A1* | 1/2010 | Hitchcock et al. | 709/206 |
| 2010/0185740 A1* | 7/2010 | Lee et al. | 709/206 |

FOREIGN PATENT DOCUMENTS

| | | |
|---|---|---|
| CN | 200580052153.X | 10/2012 |
| EP | 1557987 | 7/2005 |
| EP | 1961174 | 3/2012 |
| JP | 2005244951 | 9/2005 |
| WO | WO-2005046148 | 5/2005 |
| WO | WO-2007059796 | 5/2007 |

OTHER PUBLICATIONS

"Advisory Action", U.S. Appl. No. 11/285,396, (Jan. 25, 2010), 3 pages.

"Advisory Action", U.S. Appl. No. 11/285,396, (Nov. 03, 2010), 3 pages.

"Final Office Action", U.S. Appl. No. 11/285,396, (Aug. 16, 2010), 18 pages.

"Final Office Action", U.S. Appl. No. 11/285,396, (Oct. 28, 2009), 13 pages.

"International Search Report and Written Opinion", Application No. PCT/EP2005/013924, (Mar. 17, 2006), 10 pages.

"Non-Final Office Action", U.S. Appl. No. 11/285,396, (Feb. 22, 2010), 12 pages.

"Non-Final Office Action", U.S. Appl. No. 11/285,396, (Mar. 24, 2009), 11 pages.

"Non-Final Office Action", U.S. Appl. No. 11/285,396, (Sep. 23, 2011), 6 pages.

"Notice of Allowance", U.S. Appl. No. 11/285,396, (Apr. 23, 2012), 7 pages.

Crispin, M et al., "Internet Message Access Protocol—Version 4rev1", *IETF Standard Engineering Task Force, IETF, CH*, (Mar. 2003), 109 pages.

Del Vecchio, David et al., "Flexible Update Management in Peer-to-Peer Database Systems", *Ninth International Database Engineering & Applications Symposium*, (Jul. 25, 2005), 10 pages.

Hoschek, Wolfgang et al., "A Unified Peer-to-Peer Database Framework for Discovery", *Proceedings of the Third International Grid Computing*, (Nov. 2002), 14 pages.

Myers, J et al., "Post Office Protocol—Version 3", *IETF Standard, Internet Engineering Task Force, IETF, CH*, (May 1996), 21 pages.

"Foreign Notice of Allowance", Australian Application No. 2005338395, (Jul. 30, 2010), 3 pages.

"Foreign Notice of Allowance", Chinese Application No. 200580052153.X, (Jun. 5, 2012), 9 pages.

"Foreign Notice of Allowance", European Application No. 5819530.6, (Nov. 24, 2011), 41 pages.

"Foreign Office Action", Australian Application No. 2005338395, (Feb. 4, 2010), 2 pages.

"Foreign Office Action", Chinese Application No. 200580052153.X, (Jun. 11, 2010), 10 pages.

"Foreign Office Action", European Application No. 5819530.6, (Oct. 27, 2009), 8 pages.

"Foreign Office Action", Japanese Application No. 2008-541593, (Jan. 18, 2011), 6 pages.

"Foreign Office Action", CA Application No. 2,629,538, Dec. 19, 2013, 2 pages.

"Foreign Notice of Allowance", CA Application No. 2,629,538, Oct. 22, 2014, 1 page.

\* cited by examiner

DELIVERING MESSAGES IN A COMMUNICATION SYSTEM

RELATED APPLICATION

This application is a continuation of, and claims priority to U.S. patent application Ser. No. 11/285,396, filed on Nov. 23, 2005, the disclosure of which is incorporated by reference herein.

TECHNICAL FIELD

The present invention relates to a system and method for communicating messages from one user of a communication system to another user of the communication.

BACKGROUND

Computer-enabled communication systems incorporate an ever-increasing number of features. Accordingly, the number and types of messages that must be communicated between network elements, such as clients and servers, increase. Messages include for instance network element status information, synchronization information, network element capabilities, identification information, authorization information, instant messages, real-time communication messages such as audio and video packages, etc.

The main body of data exchanged in a communication system consists of the content information as such. In a real-time audio/video communication session, the content information consists of audio/video packages that are formed when sound and images are captured and translated into a digital format. Along with the content information as such, control messages such as information regarding a user's identity or network presence, are exchanged. The content information and control messages may be more or less integrated.

Typically, when a first user of a communication system wishes to send a message to a second user, the first user sends his message to a message server that the second user will query in order to see if there are new messages for him. In an email system, for instance, a sender forms an email to be delivered to a recipient. Subsequently, the email is transmitted to an email server along with information identifying the recipient. Users of the email system will send frequent query messages, a type of control message, to the email server in order to determine whether they are recipients of new emails. When the recipient queries the email server after the sender's email has been delivered to it, he will receive an indication that he is a recipient of the email. To have a sense of real-time delivery, users may prefer to query the email server quite frequently, for instance once every second or even more frequently. Upon receiving the indication that he is a recipient of the message, he may request and receive the message from the email server.

A query may contain authorization information, such as a user identity and a password, possibly along with an authorization certificate of some kind. The query may also include a time stamp or other unique signature. If the email system is used by many users, the resources required to handle the queries may eventually exceed the system's capacity. For instance, the email server's central processing unit (CPU) may be unable to process all the data going in and out. Exchange of emails and queries to and from the email server may also require network resources beyond the system's capacity The result is that the email server stops functioning correctly, which in turn means system downtime and frustration for the system's users who depend on the email system to deliver their messages.

SUMMARY

In a first aspect of the invention, a message delivery system is provided. The system comprises:
a message server configured to
   receive a message from a first computing system and provide a message ID in response to receiving the message, the message ID being formed to identify the received message;
   transmit the message ID to a message ID database;
   transmit the message to a second computing system in response to receiving a message request from the second computing system.
the message ID database, configured to
   provide a message ID response to the second computing system in response to receiving a message ID query from the second computing system, the message ID response comprising information about message IDs stored in the message ID database.

Such a system can be used to deliver a message from one person, a sender, to another person, a recipient. The message from the first computing system may for instance be generated by the sender using the first computing system. The message may contain any type of information. It may be a file, such as a voicemail, an email, an instant message, an entry for a weblog, a web page data or a video clip. It may also be an executable program, a compressed file, a dynamic link library (DLL), etc. The message may also be a part of a file to be transferred.

When the message server receives the message from the first computing system, it assigns to it a message ID that can comprise for instance the type of information described earlier, such as authorization information, a time stamp, and a message number, for instance a number that indicates how many messages the message server has received in total from users of the system.

A message ID may comprise a significant amount of information, having a size of for instance 1 kB. If a million users send a query of that size to the message server each 10 seconds, the message server will need to exchange an average of 100 MB of data each second. Including overhead (such as network control messages etc.), the required bitrate can therefore reach 1 or so gigabits per second, a large, even too large, amount for most computing systems and networks. On top of the exchange of queries comes the exchange of the actual messages themselves. It can be desirable in the present system that message IDs are communicated to a separate database, the message ID database. This allows a computing system to obtain information about messages on the message server without needing to contact the message server, and thus the load on the message server related to queries other than requests for messages are moved away from the message server and on to the message ID database. Thus, in one or more embodiments, the message ID database and the message server are mutually at least substantially resource-independent with respect to at least their network resources or their processing resources or both, or they are substantially independent with respect to all resources (except external resources such as electrical power and other parameters that do not influence the performance of either of the message ID database and the message server). In other words, the two systems are separated.

A message ID response returned by the message ID database may for instance contain the message ID identifying the message on the message server. In this way, a specific message can be requested from the message server, which typically holds many messages. Alternatively, the response may indicate that a message is ready for retrieval, without providing further details about the message, such as its message ID. In this case, the response is simply an indicator that indicates whether or not a message has been delivered to the message server (by a first computing system).

A sender typically intends the message for a specific recipient, and it might be desirable to have the message server include into the message ID the recipient's identity, information that would typically be provided to the message server by the sender. By having the message server include recipient information into the message ID, the message ID database will be able to respond to a query by delivering recipient-specific information, such as recipient-specific message IDs (message IDs that indicate a specific recipient).

Embodiments of a message delivery system according to the first aspect of the invention may comprise the message server, the message ID database and the first computing system. Other embodiments of the message delivery system according to the invention may comprise the message server, the message ID database and the second computing system. Other embodiments of the message delivery system according to the invention may comprise the message server, the message ID database, the first computing system and the second computing system.

In a second aspect of the invention, a computing system for receiving a message from a message server is provided, the system being configured to:

send a message ID query to a message ID database, the message ID database being configured to store message IDs and to transmit a message ID response to the computing system in response to receiving the message ID query, the message ID response comprising information about message IDs stored in the message ID database;

receive the message ID response from the message ID database;

upon receiving the message ID response, determine whether the message ID response indicates that a message is ready for retrieval from the message server; in the affirmative then to:

request, by sending a message request to the message server, that the message server transmits the message to the computing system;

receive the message transmitted from the message server.

The system is capable of determining whether a message is ready for delivery from a message server. It may do so by sending a message ID query to a message ID database to inquire about message IDs related to messages residing on the message server. The message ID response returned by the message ID database may for instance contain a message ID identifying a message on the message server. This allows the computing system to request a specific message from the message server, which typically holds many messages.

The computing system contacts the message ID database rather than the message server to determine whether a message is ready for delivery. Typically, a user of the computing system will want to frequently find out whether he is a recipient of a message which is ready for delivery from the message server. In many practical scenarios, the user will submit message ID queries (via the computing system) more frequently than messages are made available for him at the message server (messages being made available when a sender sends a message of which the user is a recipient). In other words, a majority of message ID queries may indicate that no messages are ready for delivery. Sending a message request to the message server in this case would be futile, and systems according to the second aspect of the invention eliminate the load associated with such futile requests, leaving the message server to assign its resources to the receiving and sending of messages, and to pushing message IDs to the message ID database.

In some embodiments of the computing system according to the second aspect, the message ID response contain a message ID, which, if transmitted to the message server in a message request, can be used by the message server to locate specific messages.

In a third aspect of the invention, a method for handling one or more messages from a sending computing system is provided, the method comprising the steps of:

a message server providing, in response to receiving the one or more messages, transmitted from the sending computing system, one or more message IDs identifying the received one or more messages;

the message server transmitting at least one of the one or more message IDs to a message ID database;

the message ID database receiving the at least one transmitted message ID.

This method provides a way of announcing that a message is ready for retrieval from a message server. Message identifiers, the message IDs, are made available at a separate database, the message ID database, and a computing system may therefore inquire about messages held at the message server without having to contact the message server, but by contacting the message ID database instead.

Embodiments of the method according to the third aspect may also include the step of the sending computing system transmitting the one or more messages to the message server.

The step of transmitting at least one message ID from the message server to the message ID database may comprise the steps of:

the message server transmitting the at least one message ID to the sending computing system;

the sending computing system transmitting the at least one message ID to the message ID database.

This approach may be desirable because a connection has been established between the sending computing system and the message server to allow the one or more messages to be transmitted to the message server. Reusing this connection is efficient because the message server then needs not spend resources on establishing a new connection, such as a direct connection to the message ID database. This load is instead put on the sending computing system.

Embodiments of the method according to the third aspect may also include a step wherein a receiving computing system submits a message ID query to the message ID database, the message ID database in return providing a message ID response, the message ID response comprising information about message IDs stored in the message ID database. The information provided by the message ID database may for instance include the message ID originally provided by the message server and delivered to the message ID database. In a further step, the receiving computing system may determine whether the message ID response indicates that a message is ready for retrieval from the message server. These steps allow a user of the receiving computing system to determine whether the message server contains a message for him. In the affirmative, the receiving computing system may request the message from the message server, and the message server can then respond by transmitting the requested message to the receiving computing system.

It can be desirable that the message server is only contacted by the receiving computing system in case the message ID response indicates that a message is ready for retrieval at the message server. If no messages are ready for retrieval, contacting the message server to request messages would be fruitless and would burden the message server unnecessarily.

In the step wherein the receiving computing system requests messages from the message server, the recipient may choose to request only certain messages, even though the response from the message ID database may indicate more than one message ID (meaning that several messages are available at the message server). To do that, the receiving computing system may filter the message IDs according to certain criteria, such as a message size or a message age or a message importance parameter or other parameter, incorporated into the message ID by the message server in accordance with instructions for instance from the sender or by criteria set forth at the message server itself.

The receiving computing system may also store message IDs indicated in a message ID response. This mechanism can be used as a filter by the receiving computing system when deciding whether to request a specific message from the message server or not. If a message ID contained in a message ID response from message ID database corresponds to a message that the receiving computing system has already requested and received from the message server, the receiving computing system may choose not to request the corresponding message from the message server. Message IDs can also be stored in a separate database, rather than locally on the receiving computing system, as long as they are readily available for use by the receiving computing system in determining whether a specific message has already been received from the message server. By filtering message IDs as described above, the load on the message server related to retrieval of messages can be reduced to a practical minimum, namely to the transmission of messages that have not previously been received by the receiving computing system.

In some cases it may be desirable to be able to retrieve the same message more than once. This may be obtained by having the receiving computing system disregarding that a message ID obtained in a message ID response corresponds to a locally stored message ID, should this be the case.

In one or more embodiments, the comparison of a locally stored message ID with a message ID obtained from a message ID response is performed by the receiving computing system.

In a fourth aspect of the invention, a method is provided for receiving a message at a receiving computing system, the method comprising the steps of:

the receiving computing system sending a message ID query to a message ID database, the message ID database being configured to store message IDs and to transmit a message ID response to the receiving computing system in response to receiving the message ID query, the message ID response comprising information about message IDs stored in the message ID database;

the receiving computing system receiving the message ID response from the message ID database;

the receiving computing system determining whether the message ID response indicates that a message is ready for retrieval from a message server, the message server being configured to transmit the message to the receiving computing system in response to receiving a message request from the receiving computing system; and if a message is ready for retrieval from the message server, then:

the receiving computing system sending a message request to the message server to request the message;

the message server transmitting the message to the receiving computing system in response to receiving the message request;

the receiving computing system receiving the message.

It can be desirable according to the fourth aspect that the message server is contacted by the receiving computing system only if the message ID response indicates that a message is ready for retrieval at the message server.

In some embodiments of the method according to the fourth aspect, the receiving computing system may optionally request a message only if the receiving computing system has not previously requested and received the message.

In some embodiments of the fourth aspect, a step may be included wherein the receiving computing system stores message IDs associated with messages that it has requested and received from the message server. Storing message IDs corresponding to received messages provides a mechanism for the receiving computing system to decide whether to request a message from the message server or not. If a message ID response indicates a message ID which is already stored at the receiving computing system, the receiving computing system may choose not to request the message from the message server. A message ID can be obtained via a message ID query or it may be provided to the receiving computing system by the message server when the message server delivers the corresponding message in response to receiving a message request from the receiving computing system.

Although any type of database structure can be used to provide a message ID database, message ID databases in the methods and systems according to the present invention can be of a distributed nature, such as a peer-to-peer database. Such a database requires less centralized maintenance. The message ID database may also be centralized database. It may also be only partly distributed.

Should a problem arise when trying to submit a message ID query to the message ID database, a receiving computing system may instead, extraordinarily, direct the message ID query to the message server itself as a backup approach. It may also deliberately query the message server directly. Such queries to the message server itself are infrequent, for instance once every 24 hours.

In one or more embodiments, the message ID database and the message server are at least partly mutually resource-independent, meaning that each system has its own dedicated network resources and/or processing resources. In one or more embodiments, they are entirely resource-independent. In other words, the message ID database and the message server are separate systems.

The various embodiments can be implemented for instance on an appropriately adapted hardware computing system using dedicated software. In this context, appropriately adapted means that the necessary hardware elements, such as CPU, controller, memory, network adapter and/or other elements are provided as part of the computing hardware system on which the software is to be executed. Instructions for executing the methods may also be implemented directly on hardware, such as an ASIC, or they may be executed by a combination of hardware- and software-implemented parts. Other solutions exist that attain a system capable of carrying out one or more methods according to the various embodiments.

DETAILED DESCRIPTION

Figure 1:
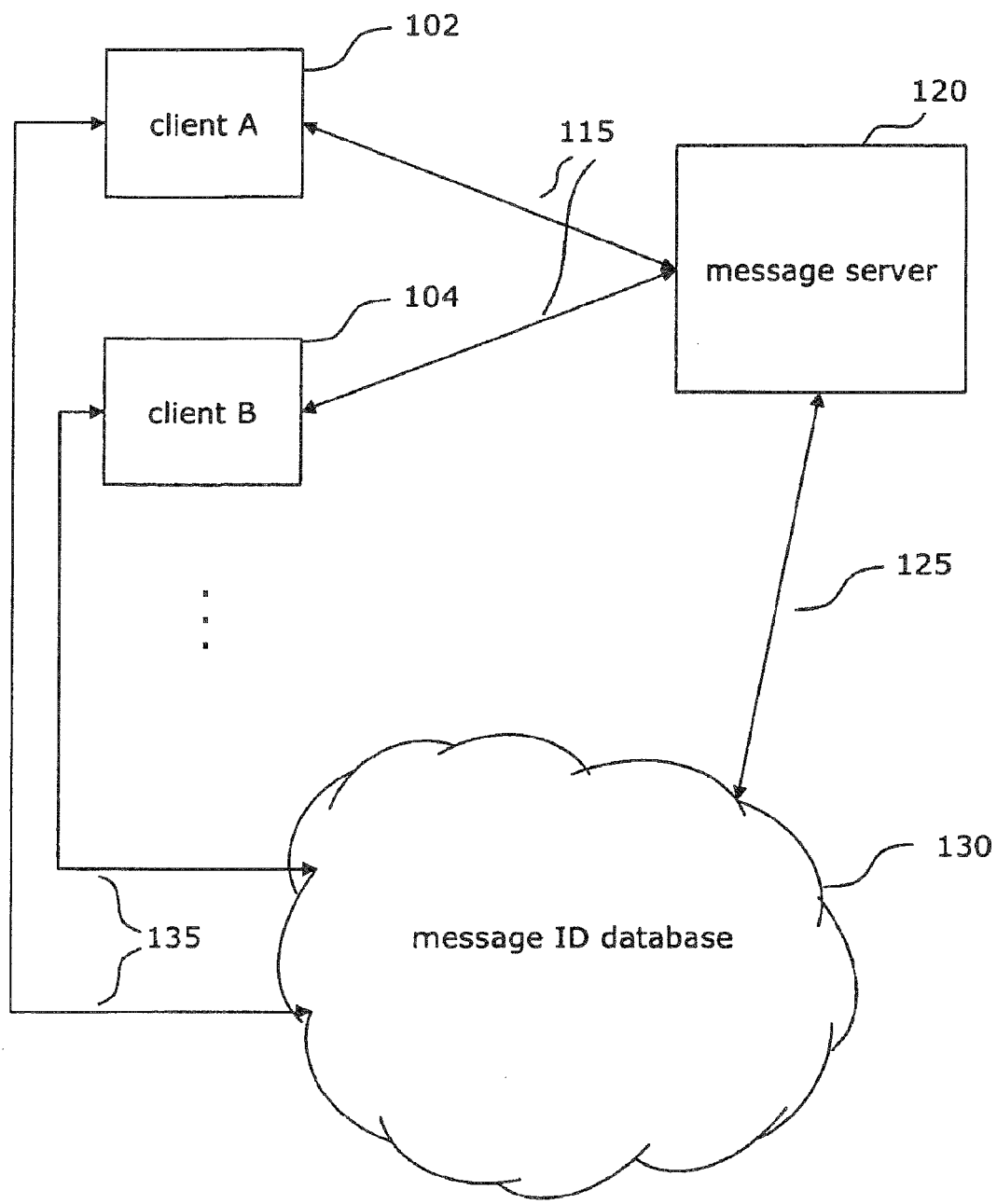
FIG. 1 illustrates a message delivery system comprising a message server, a message ID database, a first computing system and a second computing system.

FIG. 1 shows an embodiment of the message delivery system. It comprises a first computing system 102, called Client A, a second computing system 104, called Client B, a message server 120, and a message ID database 130. A User A operates Client A 102 and a User B operates Client B 104. Clients A and B (102, 104) can be operatively coupled 115 to the message server 120. Client A and B (102, 104) can also be operatively coupled 125 to the message ID database 130. Furthermore, the message server 120 may be operatively coupled 125 to the message ID database 130. The system may further comprise system elements that control Client A's and Client B's access to the message server 120 and/or message ID database 130. Instant messaging systems, voice-over-IP systems and video-over-IP systems typically employ an authority that contains user identification information related to each individual user of the system, typically in the form of an identity and a confirmation code. To maintain integrity of the user identification information the message delivery system provider typically stores the user identification information in a mainly centralized and strictly controlled system. Parts of the user identification information may also be comprised in message IDs and in message ID database queries. Such features may be included in systems and methods according to the various embodiments.

The message server 120 and message ID database 130 handle messages and message IDs during the process of delivering a message from User A to User B. The message server 120 takes care of receiving and delivering messages between User A and User B, and it delivers message IDs to the message ID database 130, either directly or via Client A 102. The message ID database 130 exchanges message IDs with the message server 120 and/or Client A 102. It also handles queries from Client B 104 and returns appropriate responses.

Figure 2:
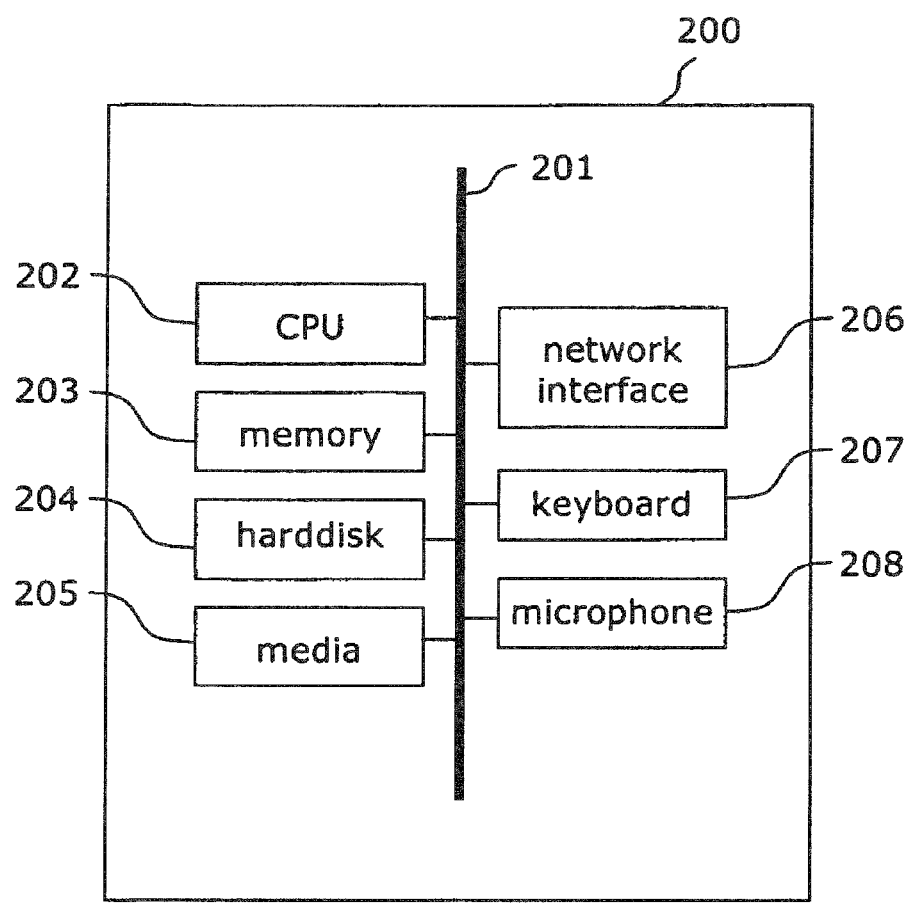
FIG. 2 illustrates a simplified computing system architecture.

FIG. 2 illustrates a simplified example of a client computing system architecture 200, for instance Client A 102. It comprises a number of elements, such as a central processing unit (CPU) 202, a memory 203, a harddisk 204, a network interface 206, and a user interface, such as a keyboard 207 and a microphone 208. These elements are interconnected via a controller (a bus) 201. The CPU 202 logically controls the elements 202-208. The memory 203 may hold both temporary and permanent information. The memory 203 may for instance hold the instructions that make the Client 102 operable to handle messages, and it may hold messages as well as data exchanged between the various elements and controller 201-208.

Messages might be provided in several ways. For instance, they may be entered via a user interface, such as via a keyboard 207 or a microphone 208, or via media 205 such as a DVD, a CD-ROM, a USB-controlled memory or the like. Other methods can be used, such as by wireless transmission from a mobile device to the computing system 200 via the network interface 206.

The harddisk 204 may for instance hold messages, instructions (software) for the CPU 202, temporary information, operating system information etc.

The network interface 206 may be used for instance for providing messages to the Client 200, and it may also be the physical element used in forming and sustaining network connections to the message server 120 and the message ID database 130.

FIG. 2 also exemplifies a typical architecture of a message server 120 and a message ID database 130, which require many of the same elements in order to be functional according to their function in the message delivery system. It may be desirable to provide the client, such as Client A 102, as a mobile unit with a built-in power source. It may also be desirable to provide it with the controlling software implemented directly on a hardware, such as an ASIC, as opposed to stored on a harddisk, such as 204, and loaded into a memory, such as 203, in order to make the computing system 200 operable. In many implementations, the harddisk 204 is entirely dispensable.

A distributed message ID database is typically a conglomerate of many systems of the type in FIG. 2, each system having significant storage capacity, for instance in the form of harddisks.

Figure 3A:
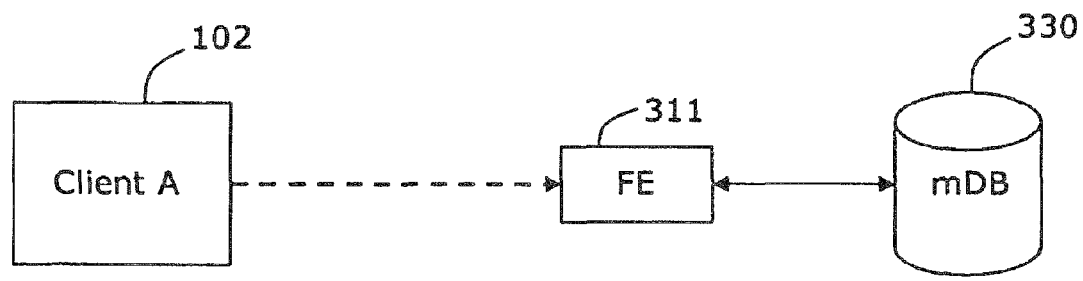
FIG. 3 illustrates a message server with multiple front ends.
Figure 3B:
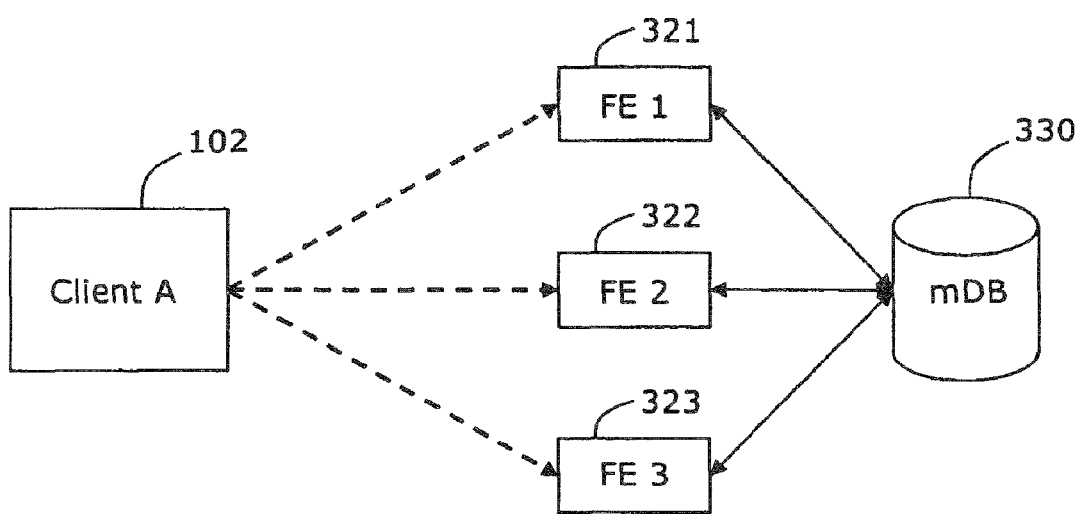

FIG. 3a and FIG. 3b illustrate two examples of ways in which a message database, mDB, 330, in a message server can be accessed. In FIG. 3a, Client A 102 accesses the message database 330 through a single front end, FE 311. For simplification purposes, the message database 330 is illustrated as a functional element, without a controller and other elements, such as those contained in FIG. 2. In FIG. 3a, Client A has only one point of entry to the message database, namely FE 311 which is operatively connected to the message database 330 as illustrated. When many clients access wish to access the message database 330 at the same time, the point of entry FE 311 may be pressed beyond its capacity and become non-functional. FIG. 3b illustrates use of 3 front ends, namely FE1 (321), FE2 (322), and FE3 (323). Client A 102 may then randomly choose between the 3 front ends 321-323 as point of entry. This will distribute and decrease the load on each front end 321-323, and in case of failure in one front end, for instance 323, the other front ends 321 and 322 ensure that the message database 330 is accessible. To this end, a client, such as Client A, may hold a list of addresses for the front ends, from which it chooses randomly.

In a typical configuration, the front ends are also connected to an authorization system (not shown) which it uses to control client access to the message database, for instance by comparing authorization information provided via Client A, to authorization data from an authorization database. In a system prior art system wherein queries for message IDs are directed to the message server itself, authorization is required at each query. It can be desirable in the present system that queries for message IDs are directed to the message ID database, which is separated from the message server, instead of to the message server itself. The security in such a system can be eased somewhat if the information, such as the message IDs, in the message ID database do not contain personal information about users.

It is particularly useful to use distributed message ID database 130, such as a peer-to-peer database, which is a mainly decentralized resource system. A peer-to-peer database requires a lower degree of centralized maintenance, it grows with the number of active clients, and the access load (such as CPU load and network load) is distributed to the clients instead of being put on a centralized system.

Figure 4:
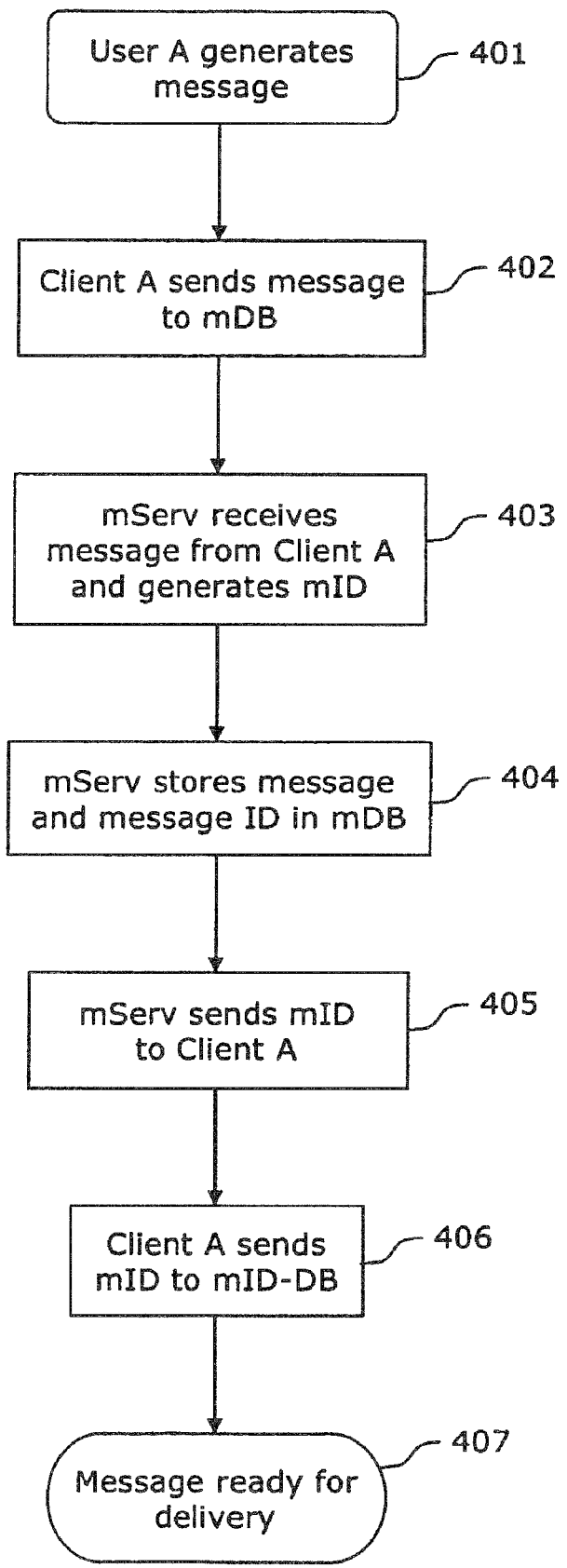
FIG. 4 is a flowchart that illustrates how a system comprising a message server and a message ID database may be prepared after a first user generates a message for a second user.

FIG. 4 illustrates the first part of the process of delivering a message from a sender, User A, to a recipient, User B. First, User A generates the message (step 401). It might be a text message entered using the keyboard or a voicemail recorded via the microphone. The message can also be an executable file. Various examples of messages were mentioned earlier. An executable file might be obtained from the harddisk, from a DVD, via a wireless network connection, or other source. User A's computing system, Client A, then transmits the message to the message server ("mServ") in step 402. The message server receives the message (step 403) and generates a corresponding message ID ("mID"). The message server stores the message and the message ID (step 404) in the message database ("mDB", see also FIG. 3). The message server then transmits the message ID to Client A (step 405), and Client A transmits the message ID to the message ID database ("mID-DB", step 406). At this point (state 407), User B will be able to query the message ID database and find that he is recipient of a message, that which was sent in step 402. In a variation of the method, steps 405 and 406 are replaced by the step (not shown) of the message server transmitting the message ID directly to the message ID database. However, this process is less efficient because a new network connection must be established, namely one between the message server and the message ID database. The method in FIG. 4 uses an already existing connection, established to the avail of steps 402 and 403. The resources required to transmit the message ID to the message ID database are thereby provided by Client A instead of by the message server.

Figure 5:
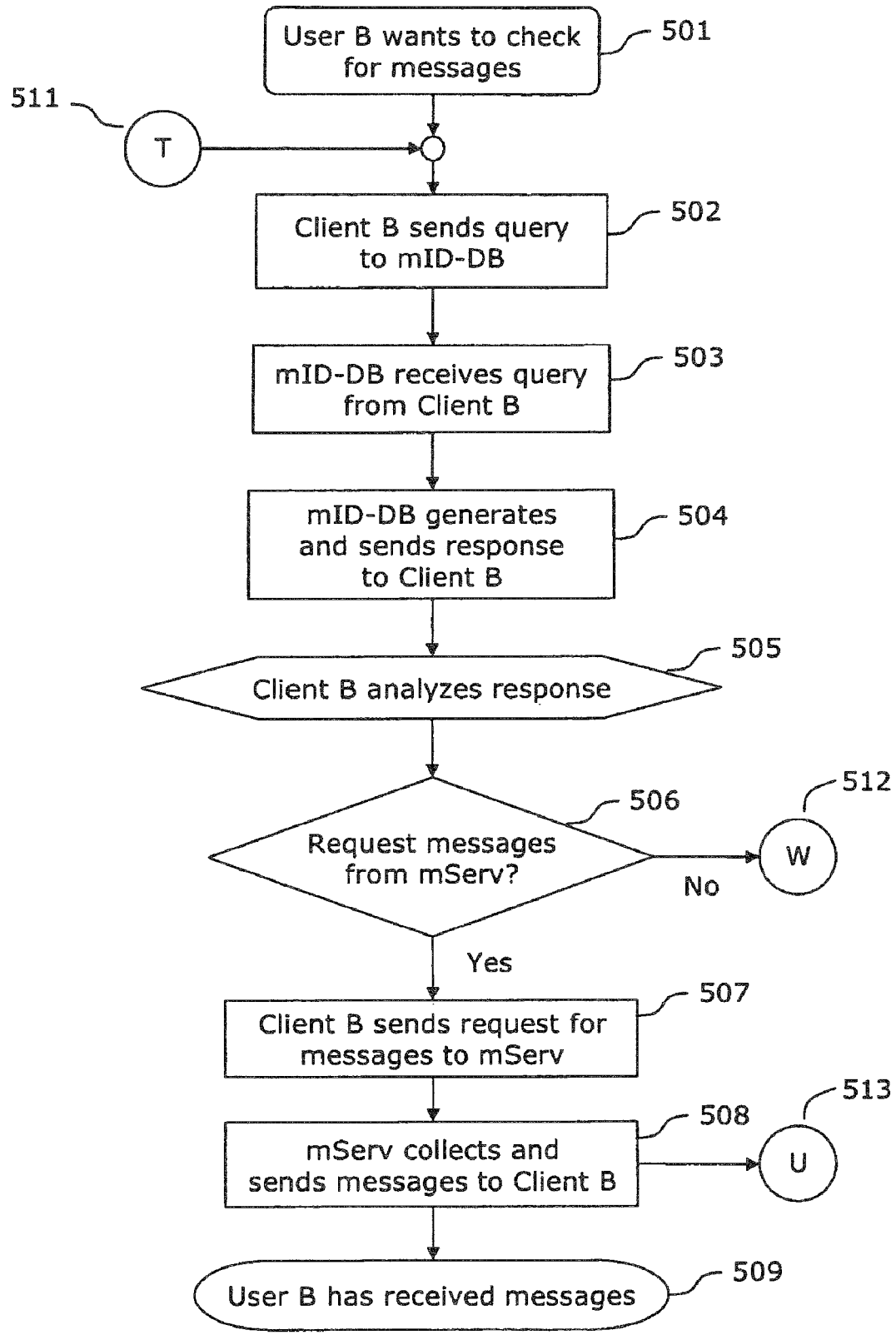
FIG. 5 is a flowchart that illustrates how a user may query the system to determine whether there are messages to be retrieved from the message database.

FIG. 5 illustrates another part of the process of delivering a message from a sender, User A, to a recipient, User B. User B wishes to determine whether he is a recipient of one or more messages. User B's client, Client B 104, may for instance be instructed to query the message ID database at a certain frequency, such as once per second. There may be other or additional schemes. For instance, User B may manually instruct his client to send a query to the message ID database. Entry point 501 is representative of User B manually ordering his client to send a query to the message ID database 120. Entry point "T" (511) symbolizes another trigger mechanism. User B's computing system, Client B, may for instance be instructed via its controlling software to submit a query each second. In step 502, Client B sends the query to the message ID database ("mID-DB"). The message ID database receives the query (step 503) and generates a response (step 504), which it sends to Client B. Client B receives the response and analyses it (step 505). Client B analyses the response to determine (step 506) whether there are messages for him at the message server ("mServ"), and to determine properties of such messages, for instance message size, age, importance etc. Optionally, Client B might request only some pending messages, chosen according to a set of criteria, related for instance to the aforementioned properties. Based on this analysis, Client B requests messages at the message server, in step 507. In step 508, the message server collects the requested messages and sends them to Client B. Finally, in state 509, User B is in possession of the messages that User A generated for him. In case Client B decides not to contact the message server 120, it will take route 512, which may involve waiting for User B to instruct the system to check for messages (entry point 501) or to wait for a trigger event (entry point 511). The system may also perform updates as indicated by 513.

Figure 6:
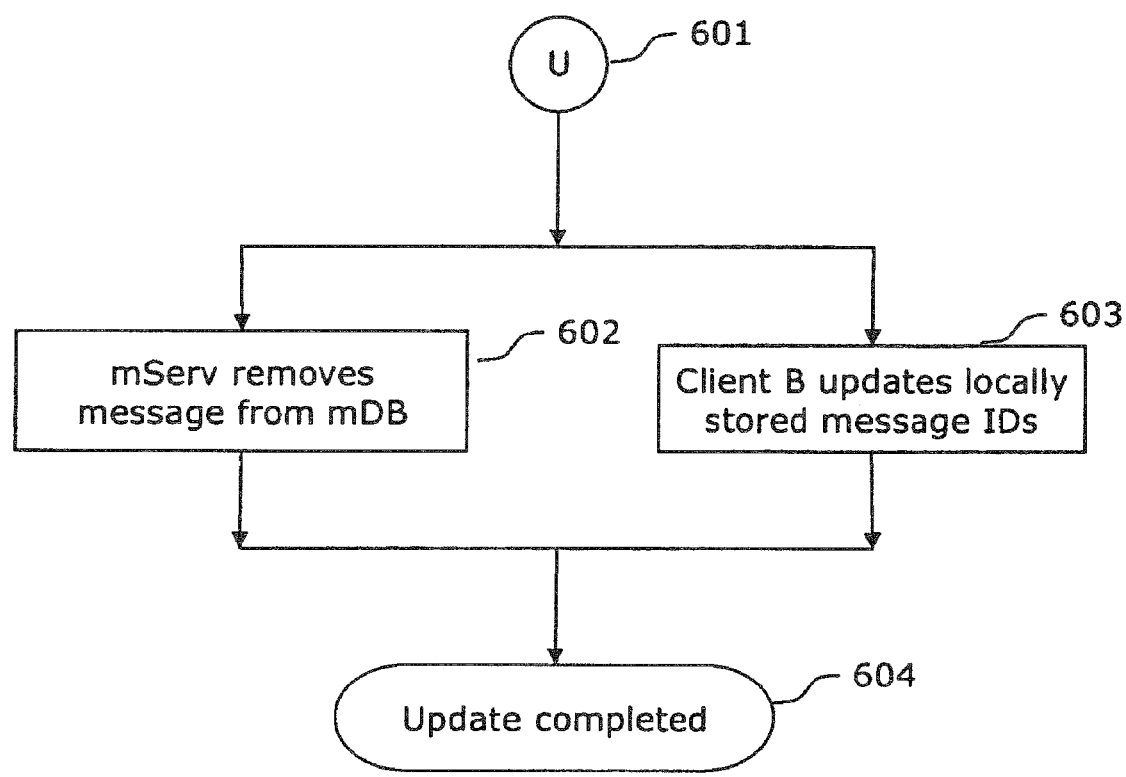
FIG. 6 illustrates how system parts may be updated after retrieval of messages from the message server.

FIG. 6 illustrates updates, such as 513 in FIG. 6, which may take place in the system after the messages have been delivered to Client B. The message server may for instance remove (step 602), from the message database, messages that have been delivered to Client B. Deleting already delivered messages will free up storage resources. In methods wherein Client B stores message IDs locally, Client B may choose to delete locally stored message IDs and instead store a message ID (step 603) that was contained in the response from the message ID database 130 to its latest query. This will bring the system into an updated state 604.

Figure 7:
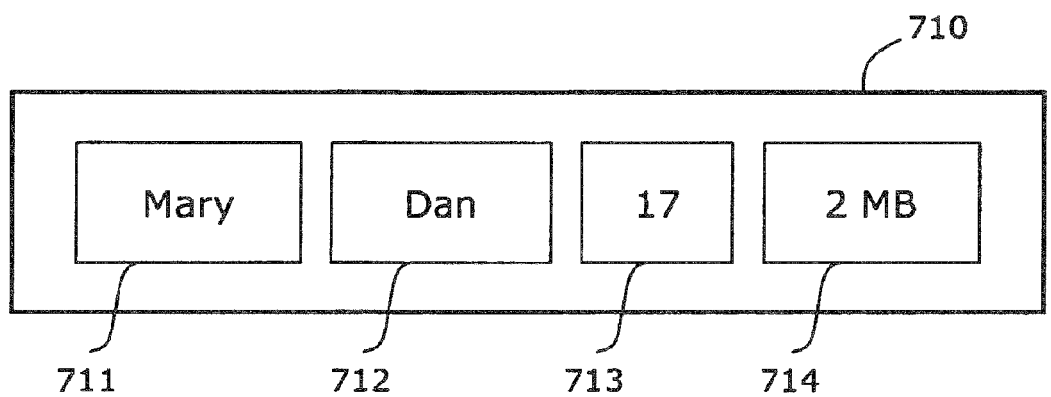
FIG. 7 illustrates examples of message IDs.
Figure 7:
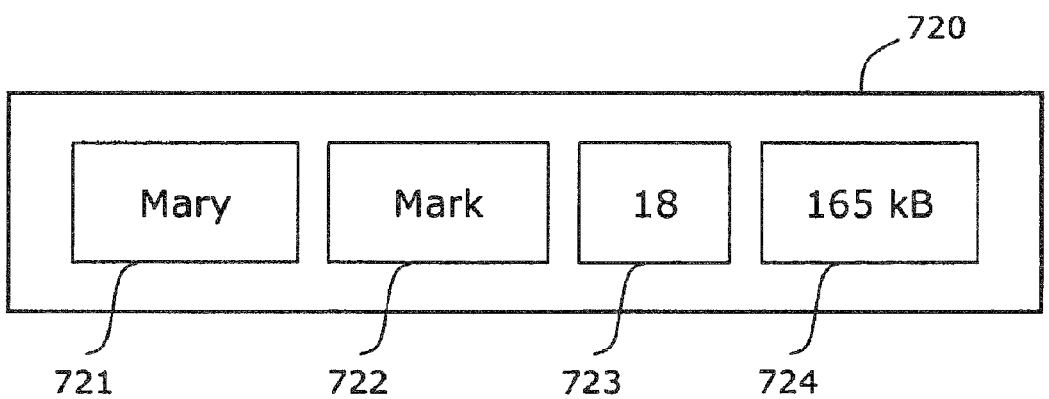

The following example illustrates a message delivery according to one or more embodiments. Dan would like to say hello to Mary on a special occasion. However, Mary is busy on the occasion and not available, so Dan will instead leave a voice message for Mary with best wishes. Dan forms a message, m1, intended for Mary. Dan uses a microphone (exemplified by 208 in FIG. 2) to record the message. After recording the message, his computing system, Client A 102, connects to the message server 120 and transmits the message, m1. After receiving the message, m1, the message server 120 forms a message ID, m1-ID, identifying the message. The message ID m1-ID is illustrated in FIG. 7. The message server 120 then stores message and message ID. In this example the message ID 710 contains an identity 711 of the recipient (Mary) and an identity 712 of the sender (Dan). The message ID further contains a message number 713 indicating how many messages the message server has received with Mary as a recipient. If the message server has previously received 16 messages, the message ID 710 may contain a message number indicator "17". The message server then sends the message ID to Client A, which then sends the message ID to the message ID database. In the present example, the message ID will furthermore contain the size of the message 714.

If, at this point, Mary checks for messages by having her computing system, Client B, send a query to the message ID database 130, she will receive a response from the message ID database 130, for instance in the form of the message ID 710 itself. Client B analyses the message ID and finds the message number tag "18". Client B then proceeds to contact the message server 120 to request the corresponding message, m1, which the message server 120 then delivers. Mary has now received Dan's voice message.

In case Mary had sent a query to the message ID database at a time the message server 120 did not contain any messages for her, she might receive an empty response and thus would not subsequently contact the message server 120. Thus, Mary burdens the message server 120 only when there are message to be retrieved.

In another instance, a third user of the system, Mark, wants to send a message, m2, to Mary. In this example, Mark sends the message after Dan has sent message m1. Mark generates the message, and his client, Client C, sends the message to the message server 120. Mark wants to send a text message to Mary. He forms the message using a keyboard in his computing system. Client C then connects to the message server 120 and transmits the message m2 to it. After receiving the message, m2, the message server 120 forms a corresponding message ID, m2-ID (720 in FIG. 7), and stores the message, m2, and the message ID m2-ID. At this point, the message server has previously received 18 messages on behalf of Mary, and thus the message ID, m2-ID 720, will contain the message number indicator "19" as shown in 723 in FIG. 7. The message server then sends the message ID m2-ID 720 to Client A, which sends it to the message ID database 130. If Mary checks for messages, by having her computing system, Client B 104, send a query to the message ID database, she will receive the new message ID, m2-ID. As in the previous example, Client B 104 will request and receive the corresponding message, in this case m2, from the message server 120.

In case Mary had not yet retrieved message with the message ID m1-ID and number indicator "18" (713), the message ID database 130 may instead respond with two message IDs, namely m1-ID 710 and m2-ID 720. Client B 104 may then proceed and request both m1 and m2 from the message server 120.

In the instance where the voice message, m1, is relatively large, as indicated by 714 in FIG. 7, Mary might want to fetch only the text message that has a smaller size, illustrated by 724. It may be that Mary is operating with a network connection, illustrated by 115 in FIG. 1, that would require that an excessive amount of time be spent in order to retrieve the voice message m1. When Client B 104 analyses the response from the message ID database 130, the message size component will reveal that the message m1 is too large to be retrieved via the present network connection. By testing the network connection speed, Mary's client, Client B 104, may itself give an estimate of the time that it will take to transmit m1 from the message server 120 to Mary's client 104. Mary can make the decision as to whether the retrieval time is acceptable, or Client B 104 may decide via the software instructions on Mary's behalf, that the message is too large to be fetched at that moment. Client B 104 will then store the message ID, m1-ID 710, to indicate that the message has not yet been retrieved. Client B 104 will request only message m2, not m1. At a later point, when the network connection speed is high enough to give an acceptable retrieval time for message m1, Client B 104 may request this message. Once a message has been retrieved, Client B 104 may delete the corresponding message ID, m1-ID 710. In another implementation, Client B 104 retrieves m1-ID 710 and m2-ID 720 from the message ID database 130 as before, but now Client B 104 instead instructs the message ID database 130 to continue to store m1-ID 710 but remove m2-ID 720. When Client B 104 queries the message ID database 130 at a later point, the response from the message ID database 130 will again contain m1-ID 710, and Client B 104 may then once again decide whether to request the corresponding message from the message server 120 or once again leave it there for later retrieval.

In another implementation, the message ID database 130 holds only the latest message ID and no message ID if there are no messages on the message server. In the example above, message ID m1-ID 710 would be replaced by m2-ID 720 once the message server 120 receives the second message, m2. In this case, Client B 104 would receive only m2-ID 720 in response to a query. When making the request to the message server 120, the message server 120 will collect all remaining messages using m2-ID 720 as an indicator. Since neither m1 nor m2 have been retrieved, the message server 120 will provide both m1 and m2 in response to the request from Client B 104. After retrieval of the messages, the message ID database 130 may delete the latest message ID, in this case m2-ID 720. It may do so for instance by instruction from Client B 104. Next time Mary's client, Client B 104, sends a query to the message ID database 130, it will receive an indication that there are no messages for Mary. Client B 104 will thus not contact the message server.

In an alternative implementation, the message ID database 130 always holds the latest message ID. In the example above, the message ID database would first hold m1-ID 710. Upon receipt of m2, the message server 120 will form and send m2-ID 720 to the message ID database 130, which will then replace m1-ID 710 with m2-ID 720. When Client B 104 queries the message ID database 130, it will always receive a message ID. As an example, the message ID database 130 may hold a message ID having a message number indicator of "16" prior to the message server 120 receiving message m1 from Client B. A previous query from Client B 104 to the message ID database 130 has provided Client B 104 with the message ID, m0-ID, corresponding to a message m0. In other words, the message number indicator in m0-ID is "16". When Client B 104 received this message ID from the message ID database 130, it requested and received the corresponding message, m0, from the message server 120. At the same time, it stored the message ID m0-ID locally. After the message server 120 has received m1, generated m1-ID 710 and sent m1-ID 710 to the message ID database 130 to replace m0-ID, a query from Client B 104 to the message ID database 130 would provide a response to Client B 104 indicating that the latest message received by the message server has message number "17". Since Client B 104 at this point has message ID m0-ID stored locally, it infers that a new message is ready for retrieval at the message server. Client B 104 thus contacts the message server 120 and requests and receives the message m0 from the message server 120. Client B 104 would then replace its previously stored local message ID, m0-ID, with the most recent message ID, now m1-ID. If both m1 and m2 have been received by the message server 120, and no further messages have been received, the message ID in the message ID database 130 will be m2-ID. In case Client B 104 has only retrieved the message with message number "16", the locally stored message ID will be m0-ID. A query to the message ID database 130 will return m2-ID. Since the locally stored message ID and the message ID in the message ID database 130 are different, Client B 104 will request messages from the message server 120. The message server 120 will collect the remaining messages, in this case m1 and m2, and deliver them to Client B 104. Client B will then store m2-ID locally, and so on.

Figure 8:
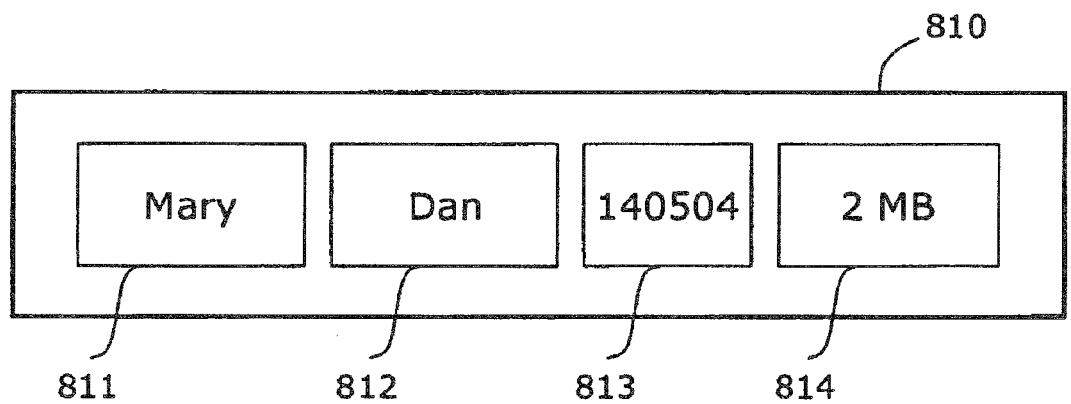
FIG. 8 illustrates other examples of message IDs.
Figure 8:
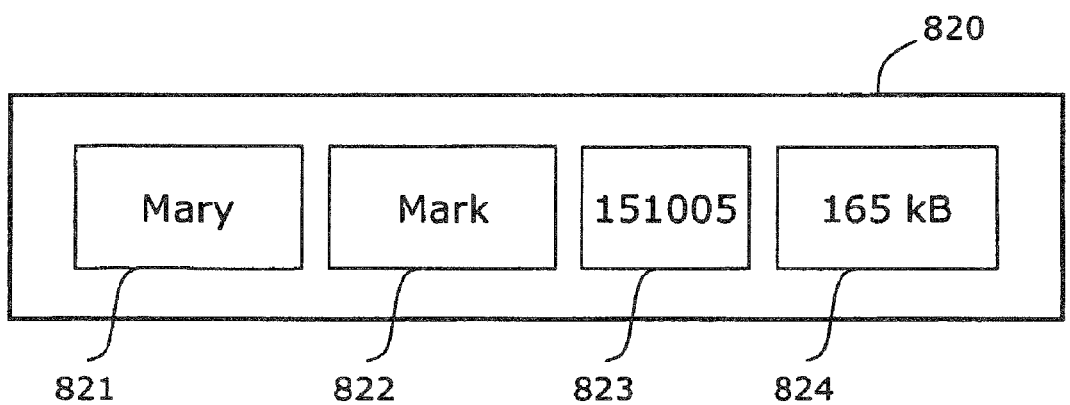

FIG. 8 illustrates another type of message ID. In the message ID illustrated in FIG. 7, indicators 713 and 723 represent the total number of messages that the message server 120 has received on behalf of the recipient, Mary in this case. The message ID in FIG. 8 contains a global message number instead. The message server receives messages not only on Mary's behalf, but also on behalf of Dan, Mark and other users of the system. The message IDs illustrated in FIG. 8 have a significant benefit over those illustrated in FIG. 7. Using the message IDs of the type in FIG. 7, the message server must hold a database containing information about the number of messages it has already received on behalf of each user of the system. Using the message ID in FIG. 8, the message server needs only count the total number of messages it has received on behalf of all users of the system.

FIG. 8 illustrates what the two message IDs to Mary could look when this message ID structure is used. The following example describes how messages may be delivered using this message ID structure. The example is based on the same scenario as the example above.

Dan would like to say hello to Mary on a special occasion. However, Mary is busy on the occasion and not available, so Dan will instead leave a voice message for Mary with best wishes. Dan forms a message, m4, intended for Mary. Dan uses a microphone (exemplified by 208 in FIG. 2) to record the message. After recording the message, his computing system, Client A 102, connects to the message server 120 and transmits the message, m4. After receiving the message, m4, the message server 120 forms a message ID, m4-ID, identifying the message. Instead of forming a message ID of the type m1-ID 710 illustrated in FIG. 7, the message server 120 is now configured to generate m4-ID illustrated by 810 in FIG. 8. The message server 120 then stores the message and the message ID. In the present example, the message ID 810 contains, just as in the previous example, an identity 811 of the recipient (Mary) and an identity 812 of the sender (Dan). The message ID also contains the global message number 813 indicating how many messages the message server has received in total on behalf of all users. If the message server has received, for instance, 140503 messages prior to receiving Dan's message m4, the message ID m4-ID 810 for m4 will be formed to contain the global message number 813 indicator "140504". The message server then sends the message ID to Client A (Dan's computing system), which passes the message ID on to the message ID database. In the present example, the message ID furthermore contains the size of the message, indicated by 814, just as in the previous example.

If at this point Mary checks for messages by having her computing system, Client B, send a query to the message ID database 130, she will receive a response from the message ID database 130, for instance in the form of the message ID m4-ID 810 itself. Using the present type of message ID, Client B will need to store the latest message ID it received in order to determine whether a new message has arrived. When Mary's computing system analyses the message ID 810 just received as a message ID response, it finds the global message number "140504". If Mary has previously received a message with a global message number of for instance "50272", her client, Client B, will see that the global message number 813 in the message ID now stored for Mary in the message ID database (and transmitted to Client B via the message ID response) is different from that stored locally on Mary's client, Client B. Client B may therefore proceed to contact the message server 120 to request the message corresponding to the message ID revealed by the response, namely m4-ID 810. In response, the message server 120 delivers message m4, and Mary has now received Dan's voice message.

In case Mary had sent a query to the message ID database at a time when the message server 120 did not contain any messages for her, she would receive the global message number identical to the one stored locally on her computing system, in this example "50272" as described above, because the message ID stored for Mary in the message ID database had not been modified since no new messages had arrived for her. Her client would therefore not subsequently contact and burden the message server 120 unnecessarily.

Now, as in the previous example (where message IDs of the type in FIG. 7 were used), a third user of the system, Mark, wants to send a message, m5, to Mary. As before, Mark sends the message after Dan has sent his message m4. Mark generates the message, m5, and his client, Client C, sends the message to the message server 120. Mark wants to send a text message to Mary. He forms the message using a keyboard (exemplified by 207 in FIG. 2) in his computing system. Client C then connects to the message server 120 and transmits the message m5 to it. After receiving the message, the message server 120 forms a corresponding message ID, m5-ID (820 in FIG. 8), and stores the message m5 and the message ID m5-ID. Since the message number in the present type of message ID is a global message number, any messages that have been received in between Dan sending his message (m4) and Mark sending his (m5) will have added to the global message number, which was "140504" when the message ID m4-ID for Dan's message, m4, was formed. The global message number may for instance be "151004" at the time when Mark's client, Client C, sends Mark's message, m5, to the message server 120. When Mark's message is received at the message server 120, it will be assigned global message number "151005", as shown in 823 in FIG. 8. The message server then sends the message ID m5-ID 820 to Mark's computing system, Client C, which passes it on to the message ID database 130. If Mary checks for messages, by having her computing system, Client B 104, send a query to the message ID database, Client B's analysis of the response will reveal that the global message number indicated in her message ID is now "151005", which differs from the one stored locally on her computing system, "140504" in case she has already fetched message m4 from Dan. Client B 104 will request and receive the corresponding message, in this case m5, from the message server 120.

Had she not received message m4 before finding the global message number "151005" in the message ID database, her locally stored message ID would still be "50272", and the message server might instead respond to a message request from Mary by collecting and delivering all messages for Mary, in this case both m4 and m5. Her computing system, Client B, might then store m5-ID locally to indicate that m5 was the latest message she has received.

It should be recognized that the figures represent only certain embodiments of the invention. The systems and methods may be varied in a number of ways that still fall within the scope of the claims but which might nevertheless be illustrated by flow charts organized differently from those presented in this specification.

A person skilled in the art will also recognize that message IDs of the type described can be varied in an unlimited number of ways. It is to be understood that the use of the term "message ID" also covers variations or reshaping made to a message ID as formed by the message server. A message ID may for instance be stripped of some of the original information laid out by the message server. Any such translation or modification falls within the scope of the claims to the extent that the modified message ID, if presented to the message server in a message request, allows the message server to identify the message corresponding to the original (not modified) message ID.

What is claimed is:

1. A message delivery system comprising a message server including one or more computer processors configured to:
   receive a message from a sending computing system and subsequently generate a message ID in response to receiving the message, the message ID being generated to identify the received message, the message being intended for a receiving computing system;
   cause the message ID to be pushed to a message ID database that is separate from the message server, the message ID database implemented by one or more decentralized resources of a peer-to-peer database;
   receive, prior to transmitting the message to the receiving computing system, a request from the receiving computing system that includes at least some information contained in the message ID, the at least some information contained in the message ID obtained from a message ID response returned by the message ID database responsive to a message ID query submitted by the receiving computing system; and
   responsive to receiving the request, transmit the message to the receiving computing system.

2. The message delivery system of claim 1, wherein the message server is configured to cause the message ID to be pushed to the message ID database through the sending computing system.

3. The message delivery system of claim 1, wherein the message server is configured to cause the message ID to be pushed directly to the message ID database from the message server.

4. A receiving computing system for receiving a message from a message server including one or more computer processors, the receiving computing system being operable to:
- send a message ID query to a message ID database rather than to the message server;
- receive a message ID response from the message ID database, the message ID response comprising information about message IDs stored in the message ID database; and
- upon receiving the message ID response, determine, without contacting the message server, whether the message ID response indicates that a message is ready for retrieval from the message server; in the affirmative then to:
  - request, by sending a message request to the message server, that the message server transmits the message to the receiving computing system; and
  - receive the message transmitted from the message server.

5. A system according to claim 4, wherein the message ID response contains a message ID that identifies a specific message at the message server.

6. The system according to claim 5, wherein at least some message IDs include a message number indicating how many messages the message server has received for a given recipient.

7. The system according to claim 6, wherein said at least some message IDs include message size information.

8. The system according to claim 5, wherein at least some message IDs include a global message number associated with messages intended for multiple recipients.

9. A method for handling one or more messages from a sending computing system, the method comprising:
- receiving, at a message server, one or more messages from the sending computing system, the one or more messages being intended for a receiving computing system;
- responsive to said receiving, generating, using the message server, one or more message IDs identifying the received one or more messages;
- causing, with the message server, at least one of the one or more message IDs to be pushed to a message ID database effective to enable the receiving computing system to ascertain, without contacting the message server, at least some information contained in the one or more message IDs, the message ID database being separate from the message server;
- receiving, prior to transmitting the one or more messages to the receiving computing system, a request from the receiving computing system that includes information contained in the one or more message IDs, the information contained in the one or more message IDs obtained from one or more message ID responses returned by the message ID database responsive to one or more message ID queries submitted by the receiving computing system; and
- responsive to receiving the request, transmit the one or more messages, associated with the information, to the receiving computing system.

10. A method according to claim 9, wherein said causing comprises at least:
- the message server transmitting the at least one message ID to the sending computing system effective to cause the sending computing system to transmit the at least one message ID to the message ID database.

11. A method for receiving a message at a receiving computing system from a message server, the method comprising:
- sending, by the receiving computing system, a message ID query to a message ID database rather than to a message server;
- receiving, with the receiving computing system, a message ID response from the message ID database, the message ID response comprising information about message IDs stored in the message ID database;
- determining, without contacting the message server, whether the message ID response indicates that a message is ready for retrieval from the message server;
- responsive to the message being ready for retrieval, sending a message request to the message server to request the message; and
- receiving, from the message server, the message.

12. A method according to claim 11, wherein said sending a message request is performed only if the receiving computing system has not previously requested and received the message.

13. A method according to claim 11, the method further comprising storing at the receiving computing system, upon receiving the message, a message ID associated with the message, the message ID identifying the message on the message server.

14. A method according to claim 13 further comprising sending a message request to the message server if a message ID is not available to the receiving computing system.

15. A computer program product comprising:
- computer readable code stored on a computer readable hardware storage medium configured to be executed by at least one computer processor to facilitate handling of one or more messages from a sending computer system having one or more computer processors by:
  - responding to receiving the one or more messages transmitted from the sending computing system, by generating from a message server one or more message IDs identifying the received one or more messages, the one or more messages being intended for a receiving computing system;
  - causing, from the message server, at least one of the one or more message IDs to be pushed to a message ID database that is separate from the message server, the message ID database and message server configured to provide distinct services by being mutually resource-independent with respect to network and processing resources;
  - receiving, prior to transmitting the one or more messages to the receiving computing system, a request from the receiving computing system that includes at least some information contained in at least one of said one or more message IDs, the at least some information contained in the at least one of the one or more message IDs obtained from one or more message ID responses returned by the message ID database responsive to one or more message ID queries submitted by the receiving computing system; and
  - responsive to receiving the request, transmitting the corresponding one or more messages to the receiving computing system.

16. A computer program product according to claim 15 wherein the message ID database is a distributed database.

17. A computer program product comprising:
- computer readable code stored on a computer readable hardware storage medium configured to be executed by at least one computer processor to facilitate handling of one or more messages from a receiving computing system having one or more computer processors by:

sending, by the receiving computing system, a message ID query to a message ID database rather than to a message server, the message ID database being configured to store message IDs and to transmit a message ID response to the receiving computing system in response to receiving the message ID query, the message ID response comprising information about message IDs stored in the message ID database;

receiving, at the receiving computing system, the message ID response from the message ID database, the message ID response comprising information about message IDs stored in the message ID database;

determining, at the receiving computing system, and without contacting the message server, whether the message ID response indicates that a message is ready for retrieval from the message server, the message server being configured to transmit the message to the receiving computing system in response to receiving a message request from the receiving computing system; and if a message is ready for retrieval from the message server, then:

sending, by the receiving computing system, a message request to the message server to request the message; and receiving, by the receiving computing system, the message from the message server.

18. A system according to claim 17 wherein the message ID database is a distributed database.

19. A system according to claim 17 wherein the message ID database and the message server are mutually resource-independent.

20. A computer program product according to claim 15 further comprising removing, from the message server, the corresponding message after it has been transmitted to receiving computing system.

* * * * *